United States Patent Office 3,070,139
Patented Dec. 25, 1962

3,070,139
METHOD OF MANUFACTURING PANELS AND DEVICE FOR USE IN CONNECTION THEREWITH
Eduard Witschi, Windisch, and Walter Hoppeler, Klosters, Switzerland, assignors to Muller A.G., Brugg, Switzerland
Filed Feb. 2, 1961, Ser. No. 86,744
Claims priority, application Switzerland Feb. 6, 1960
8 Claims. (Cl. 144—324)

The present invention relates to a method of and apparatus for manufacturing panels or plates made, for instance, from chips of wood or similar material or artificially produced chips of wood, in a plate press between opposing heated press plates, and also concerns a planing machine for use in connection with this method which planes the panels or plates while still warm.

Various methods are known for producing pressed plates in large area plate presses between opposing heating plates. Some of these methods are carried out in a continuous manner, and some are carried out intermittently. All of these methods have in common that the pressed plates leaving the press or cut to definite lengths will after being piled up flex or bend more or less, even if these plates are supported by stable torsion resistant plate supports. These deflections or bends are due to differences in thicknesses within the plates. Surprisingly, these plates become thinner in the direction from the marginal zone to the central zone. This phenomenon can also be observed by relatively narrow plates and reaches an intolerable magnitude with wide plates. A cooled-off plate once in this bent condition can never be 100% straightened again. In an endeavor to reduce this drawback, the pile of plates was limited to relatively few plates so that the total deflection or bend cannot add up as would be the case when making higher piles.

Furthermore, in order to counteract the above mentioned drawback, paper strips have been placed over the central portion of the plates for compensating the differences in thickness. However, all of these steps are completely insufficient for modern mass production of pressed panels or plates with an output of 100 and more tons per day. Theoretically it would appear possible to prevent the bending of the still warm pressed plates if these warm plates would immediately be ground after they have been withdrawn from the flat press. However, in this connection, the difficulty is encountered that the pressed plates when still in hot condition are rather difficult to grind.

A further drawback would be that by grinding it is possible only under difficulties to maintain precise tolerances as to thickness, because the heretofore known grinding machines with felts and grinding papers mounted thereon are more or less elastic. It should be borne in mind that for the above reasons a grinding of the warm plates was never effected and has been mentioned here only from a theoretical standpoint. Actually, the manufacturers of grinding machines to be used for this purpose require that the pressed plate has cooled off for at least 70 hours before it is machined by such grinding machine.

It is, therefore, an object of the present invention to provide a method of planing panels or plates manufactured from chips of wood and similar material in still warm condition.

It is another object of this invention to provide a planing machine table for receiving warm pressed panels or plates in warm condition whereby the heat of the latter causes the upper surface of the table to become lengthened relative to the bottom portion and convex.

Means are provided for practically preventing any deformation of the receiving surface for the material to be planed. This is done by insulating the very top layer of the table body and by providing bolts of high but varying conductivities from said top layer to the lower portion of said body so that the body will heat up from the bottom upwards at variable rates for different lateral portions to cause said lower portion to expand at the proper rates to keep the top from warping.

These and other objects and advantages of the invention will appear more clearly from the following specification in connection with the accompanying drawings, in which.

According to the present invention, it has been found that by means of a planing machine produced in conformity with the present invention for the specific requirements of the manufacture of pressed plates, it is surprisingly possible to plane the warm plates plane directly after they have left the press, and to carry out such planing with very narrow tolerances. In this way, it will now be possible subsequent to the planing operation to pile the plates up in sufficiently high piles without encountering any bending of any practical importance.

The planing of the plates immediately after they have left the press has the further advantage that the chip being removed may be made so great that, in contrast to grinding dust which, as is known, so to speak eats up the glue during the gluing operation, it can without difficulties be used again in connection with the making of such compressed plates. Pressed plates calibrated by planing in the above mentioned manner are adapted immediately to be employed for any desired purpose in which said plates have to be placed on a support base or to be lined. As a matter of fact, the adherence to a plane plate is generally better than on a ground plate.

If, however, it should be desired that the pressed plates also be ground, this will now be possible with a minimum of chip removal without encountering any danger for the tolerances in thickness. Theoretically, any desired planing machines may be employed for planing the pressed plates. However, in view of the fact that the plates when being placed on the planing machine still have a high temperature of around 100° C., it is necessary so to design said planing machine that the machine will not become distorted in view of the hot pressed plates.

The method according to the present invention is characterized in that the pressed plates withdrawn from the plate press are still in hot condition planed plane prior to piling the plates up in piles.

The above method according to the invention is preferably carried out on a planing machine having a planing machine table which is characterized by a table plate mounted on a planing machine table body and composed of one or a plurality of plate sections, said planing material receiving plate being heat insulated in the direction toward the surface of the table body. Furthermore, the said receiving plate is for purposes of a directed and controlled heat conductivity toward the underside of the table body connected to the latter by connecting elements.

Figure 1:
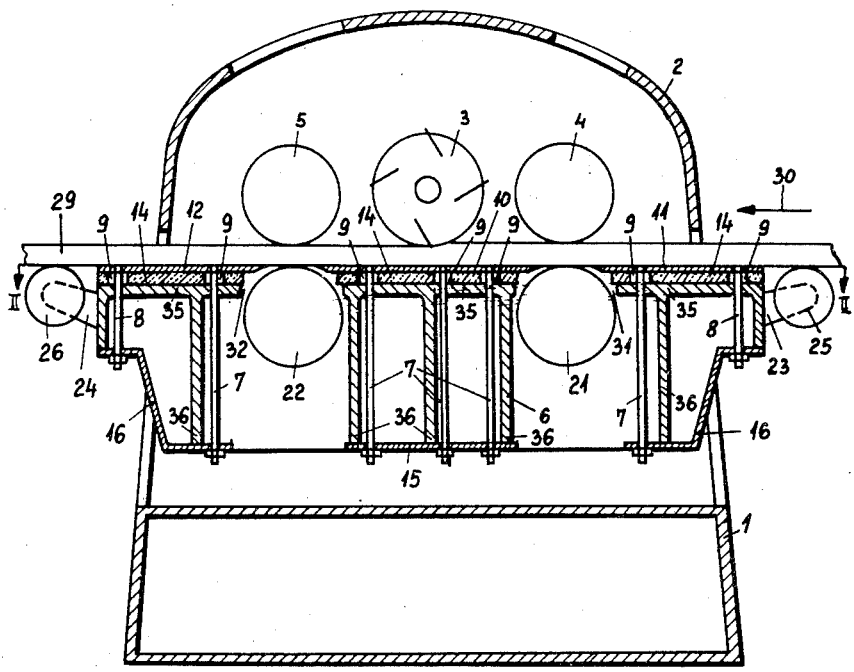
FIG. 1 illustrates a cross section through a thickness planing machine with a planing machine table according to the present invention.

Referring now to the drawings in detail and FIG. 1 thereof in particular, the arrangement shown therein comprises a base 1 supporting a frame 2 having mounted thereon a cutter cylinder 3 and spring urged front and rear feeder rollers 4 and 5 respectively. The drives and the bearings for these parts 3, 4 and 5 have not been illustrated in the drawing inasmuch as they do not form a part of the present invention. Also the customary pressure members for the goods 29 to be planed may be of any standard design and, therefore, have likewise not been illustrated. If desired, the arrangement may comprise suction devices for withdrawing the shavings. In this connection, it would have to be considered that the machining width of the planing machine is rather wide.

The drawings furthermore do not illustrate the necessary guiding means for the planing machine table body 6 and the elements for the vertical adjustment thereof because these parts likewise do not form a part of the invention.

Figure 2:
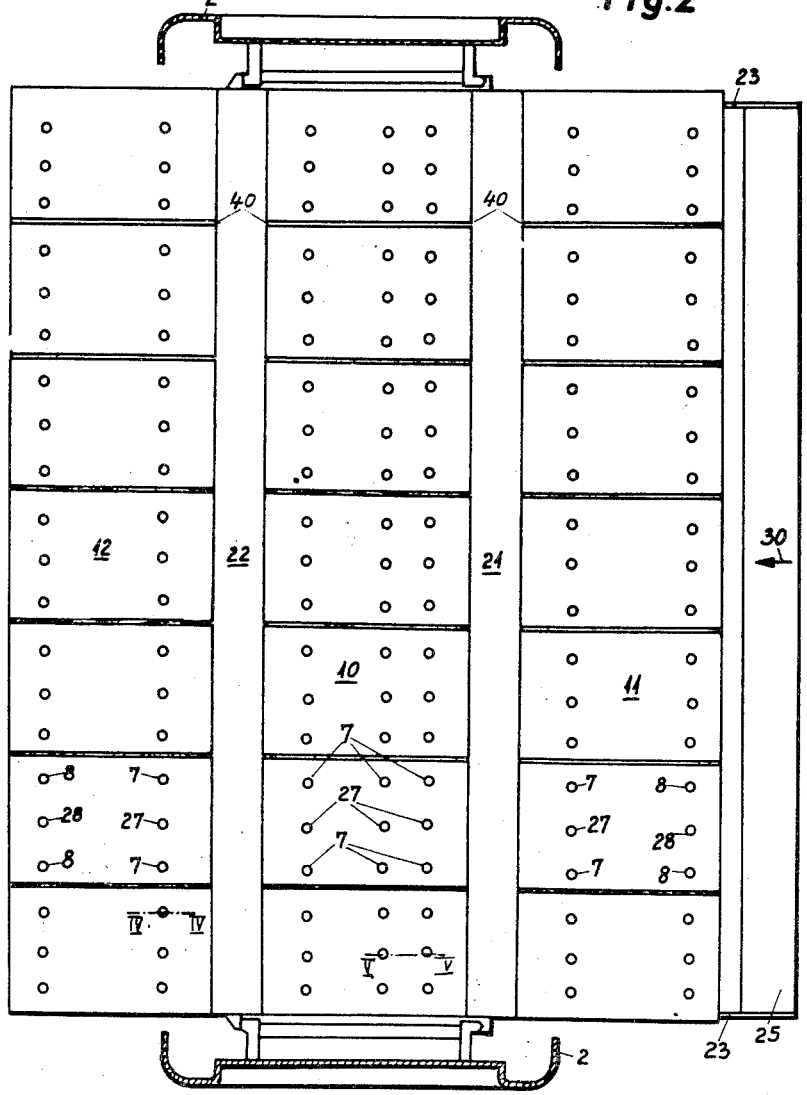
FIG. 2 shows a plane view partly in section of the planing machine according to FIG. 1, said view being seen along the line II—II of FIG. 1.

FIG. 2 illustrates the surface of the planing machine table for receiving the warm pressed plates 29. The planing machine table body 6 as illustrated in FIGS. 1 and 2 and which may for intsance have been cast, is provided with openings 31 and 32 extending through said body 6. In the said openings or passages 31 and 32 and directly opposite the two pressure rollers 4 and 5, there are provided a rear and a front table roller 22 and 21 respectively. These rollers are adjustable as to height by means not shown in the drawings and may be arrested in their respective adjusted position. Normally, the surfaces of the table rollers 21 and 22 protrude slightly from the material or work piece receiving surface of the table. The table rollers may be arranged so as either to rotate loosely or they may be driven by any standard means not shown in the drawings. On the outside of the planing machine table body 6 and, more specifically, on the work piece feeding side as well as on the work piece withdrawing side there the provided in supports 23 and 24 respectively freely rotatable rollers 25, 26 which extend substantially over the entire width of the planing machine. These rollers 25 and 26 serve to protect against damaging the goods to be planed, i.e. the pressed plates, while they are being fed to the planing machine and also while they are being withdrawn therefrom.

In particular, the rollers 25 and 26 protect the edges of the table and facilitate the manual handling of the large area pressed plates which are difficult to handle.

Figure 3:
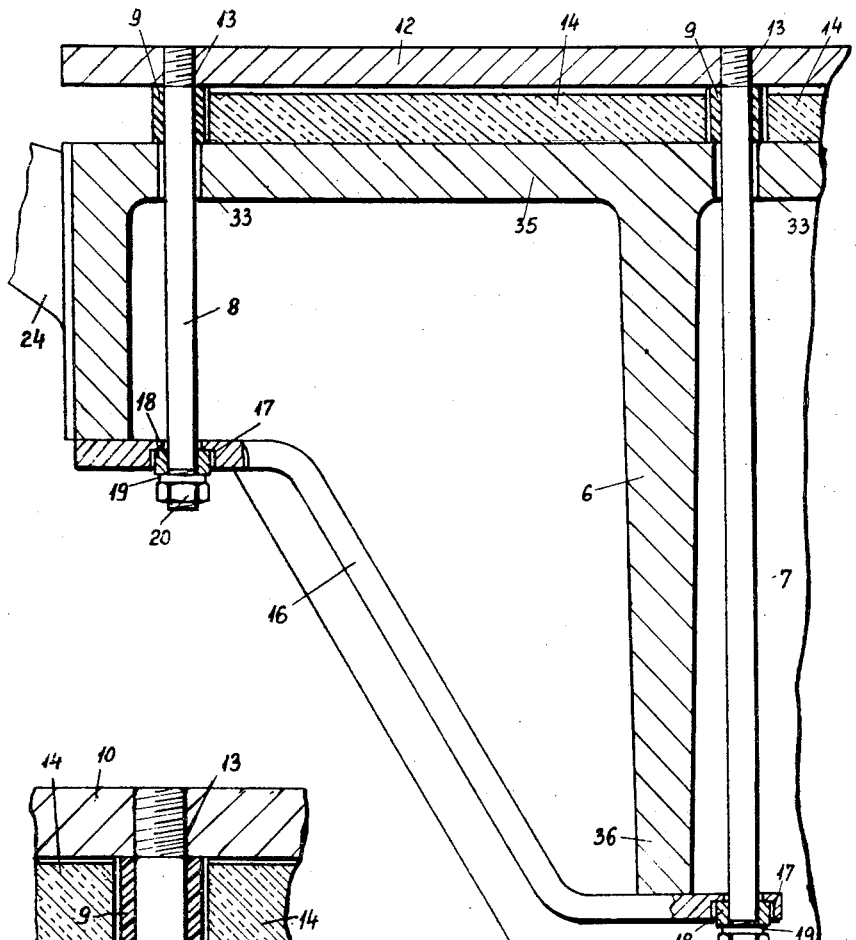
FIG. 3 illustrates on a somewhat larger scale than FIG. 1 details of the latter.
Figure 4:
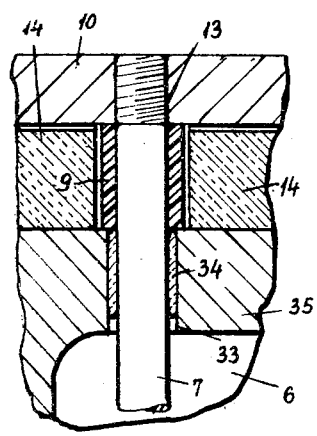
FIG. 4 is a section taken along the line IV—IV of FIG. 2 but on a larger scale than the latter.

As will be evident from FIG. 1 and even better from the illustrations in FIGS. 3 and 4, the part 35 of the planing machine table body 6 is provided with a plurality of passages 33 (in the illustrated embodiment there are approximately 147 passages) for passing therethrough short or long bolts with threads on both ends. Said bolts are designated with the reference numerals 7, 27, and 8, 28 according to length, position, and heat conductivity. FIG. 2 indicates that in the illustrated embodiment, the table surface intended for receiving the work piece 29 fed in the direction of the arrow 30 consists of a plurality of plates. Thus, in the center of the table upper part 35 there are arranged between the table rollers 21 and 22 seven central plates 10 each of which is provided with nine threaded bores 13. On the right hand and left hand side of the table rollers 21 and 22 there are provided seven side plates each 11 and 12 with six threaded bores 13 each. Between the side edges of the individually serially arranged sectional plates 10, 11 and 12 there are provided air gaps 40 which have been shown in a somewhat exaggerated way in FIG. 2 and have an actual width of approximately 0.5 millimeter.

FIGS. 1, 3, 4 and 5 illustrate how the sectional plates 10, 11 and 12 are connected to the planing machine body 6. Thus, for purposes of maintaining a uniform distance, intermediate washers and collars 9 of a suitable heat insulating material, for instance laminated thermosetting resin, are provided between the lower sides of plates 10, 11 and 12 and the upper side 35 of the table body 6. The spaces remaining between said intermediate washers and collars 9 are filled in by tables or plates 14 of a heat insulating material, as for instance cork.

The arrangement and number of the sectional plates 10, 11 and 12 may, however, be varied at random.

Figure 5:
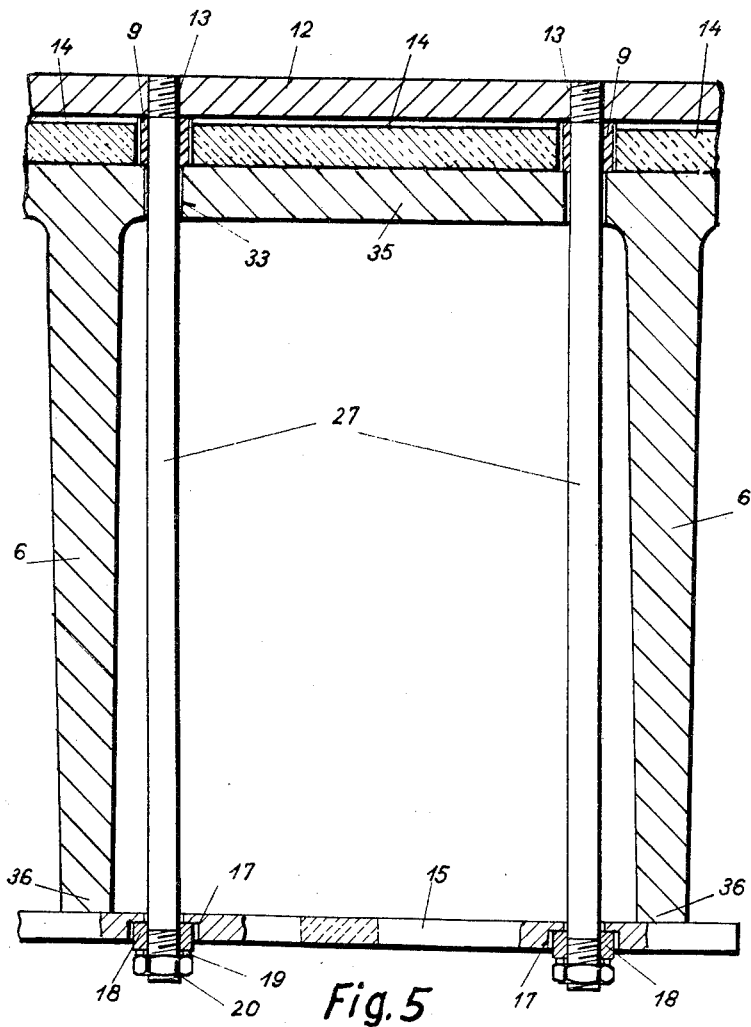
FIG. 5 is a section taken along the line V—V of FIG. 2 but likewise on a larger scale than the latter.

FIGS. 1 and 2 illustrate that each of the seven central sectional plates 10 is connected to the lower portion 36 of table body 6 by means of six long bolts 7 each and three long bolts 27 each through the intervention of three traverses 15. As will furthermore be evident from the drawings, each of the seven side plates 11 and 12 is connected to the lower portion 36 of table body 6 by two short bolts 8, one short bolt 28, two long bolts 7 and a long bolt 27 through the intervention of three stepped traverses 16. All bolts have one end thereof screwed into the threaded bores 13 of the plates 10, 11 and 12. The traverses 15 and 16 for supporting the bolts in the lower portion of the table body 6 may be of rectangular cross section as shown in FIG. 5 in dash lines and they are provided with milled-out portions 17 having mounted therein metal rings 18 for effecting a better metallic contact for facilitating the heat transfer. The said metal rings 18 are held by nuts 20 through the intervention of a spring ring 19.

Inasmuch as when machining the warm plates 29, naturally also the individual sectional plates 10, 11 and 12 will heat up, and since furthermore a heat transfer to the table plate 35 of table body 6 cannot be completely avoided, even when using the best insulating means, a certain quantity of heat is in conformity with the present invention conveyed by bolts 7, 8, 27 and 28 to the lower portion 36 of the table body 6. As a result thereof, a condition of equilibrium will be formed in the heat expansion of the portions 35 and 36 whereby the original plane surface of the table surface will be maintained. The quantity of heat to be conveyed to the lower portion 36 is determined by the heat conductivity of the bolts 7, 8, 27 and 28. Merely by way of example, the drawings illustrate that seen in the direction of the arrow 30, each of the three times seven sectional plates 10, 11 and 12 and the outer bolts 7 and 8 consist of an iron metal whereas the inner bolts 27 and 28 consist of copper. Depending on the temperature conditions in sectional plates 10, 11 and 12 as they will occur during the operation of the respective planing machine, the above example concerning the distribution of the individual bolts of iron metal and of copper may be varied in conformity with the respective requirements.

The point will always be that bolts of copper which have a considerably better heat conductivity than those of iron metal, will be so arranged that the heat equilibrium will be maintained in the portions 35 and 36.

FIG. 4 illustrates further steps against undesired heat conductivity from the sectional plates 10, 11 and 12 and bolts 7, 8, 27 and 28 arranged therein to the upper portion 35 of the table body 6. FIG. 4 shows rings 34 of a suitable heat insulating material, which rings are adapted to be inserted between the bolt shanks and the respective passages 33 in the upper portion 36 of the table body 6.

The method described herein yields the great advantage over heretofore known methods that the now plane parallel pressed plates will be directly suitable for many purposes of application. Due to the fact that the two sides of the pressed plates will be plane parallel after they have dried, it is possible to provide for a considerably lower grinding removal so that also the quantity of the produced grinding dust will be considerably reduced.

The construction of the planing machine table according to the present invention makes it possible to adapt the table to the respective conditions of operation, inasmuch as the individual bolts 8 and 28, and 7 and 27 have the same dimensions and thus can be employed wherever necessary.

It is, of course, to be understood that the present invention is, by no means, limited to the particular construction shown in the drawings but also comprises any modifications within the scope of the appended claims.

Thus, the invention is not limited to the table construction for a thickness planing machine but may also be employed in connection with the table of a rough planing machine.

What we claim is:

1. A table for planing machines, especially thickness planing machines, for receiving and machining plate-shaped material in warm condition, which includes: a planing machine table body, cover plate means arranged above said table body in spaced arrangement thereto for receiving the warm plate material to be planed, heat insulating means interposed between said cover plate means and said table body, and heat conductive means connecting said cover plate means to the lower portion of said table body for conveying heat from said cover plate means to said lower portion of said table body.

2. A table according to claim 1, in which said cover plate means is composed of a plurality of individual plates.

3. A table for planing machines, especially thickness planing machines, for receiving and machining plate-shaped material in warm condition, which includes: a planing machine table body including girder means arranged at the lower portion thereof, cover plate means arranged above said table body in spaced arrangement thereto for receiving the warm plate material to be planed, heat insulating means interposed between said cover plate means and the upper portion of said table body, and heat conductive connecting bolts having their upper ends connected to said cover plate means in a heat conductive manner and having their lower end connected to said girder means in a heat conductive manner.

4. A table for planing machines, especially thickness planing machines, for receiving and machining plate-shaped material in warm condition, which includes: a planing machine table body; cover plate means arranged above said table body in spaced arrangement thereto for receiving the warm plate material to be planed; said cover plate means when looking in the direction of movement of the plate material over said cover plate means comprising a front section, a central section and a subsequent rear section; heat insulating means interposed between said cover plate means and said table body; and heat conductive connecting belts connecting said front, central and rear sections of said cover plate means to the lower portion of said table body for conveying heat from said cover plate sections to said lower portion of said table body; those connecting bolts connecting said central section to said lower portion of said table body having a higher heat conductivity than the connecting bolts connecting said front and rear sections to the lower portion of said table body.

5. A table for planing machines, especially thickness planing machines, for receiving and machining plate-shaped material in warm condition, which includes: a planing machine table body, cover plate means arranged above said table body in spaced arrangement thereto for receiving the warm plate material to be planed, heat insulating means interposed between said cover plate means and said table body, heat conductive connecting bolts connected to said cover plate means in a heat conductive manner and extending through the upper portion of said table body and being connected to the lower portion of the latter for conveying heat from said cover plate means to said lower portion of said table body, and annular heat insulating means surrounding said bolts where the latter pass through said upper portion of said table body.

6. A table according to claim 5, in which the heat insulating means surround said bolts where they pass through the upper portion of said table body and form insulating rings for guiding and centering the respective bolts.

7. A table according to claim 1, in which the heat insulating means interposed between said cover plate means and said table body comprises first plates for heat insulating purposes and additional plates serving as spacer means between said table body and said cover plate means.

8. A method of planing panels while still warm from a hot pressing operation which includes the steps of: delivering a heated panel to a planar supporting member and advancing it across the supporting member while simultaneously planing the side of the panel opposite the supporting member, supporting the supporting member on a bed, providing heat insulating material means having heat-transmitting by-pass means between the supporting member and the bed, and conveying heat from the supporting member through said by-pass means in said heat insulating means to said supporting bed and distributing the heat substantially evenly through the width and height of the supporting bed thereby to prevent distortion of the supporting bed and said supporting member on account of the heat conveyed thereto from the panel being planed.

References Cited in the file of this patent

UNITED STATES PATENTS

| | | |
|---|---|---|
| 1,936,017 | Heuze | Nov. 21, 1933 |
| 1,983,009 | Soderberg | Dec. 4, 1934 |
| 2,349,162 | Gaskell et al. | May 16, 1944 |